N. HURET.
VEHICLE.

No. 171,137. Patented Dec. 14, 1875.

Witnesses  
Inventor

UNITED STATES PATENT OFFICE.

NARCISSE HURET, OF PARIS, FRANCE.

IMPROVEMENT IN VEHICLES.

Specification forming part of Letters Patent No. 171,137, dated December 14, 1875; application filed November 23, 1875.

*To all whom it may concern:*

Be it known that I, NARCISSE HURET, of Paris, France, have invented certain new and useful Improvements in Vehicles, of which the following is a specification:

My invention contemplates the employment of dogs or other animals, working within a cage or cages, forming part of the wheels of the vehicle to be propelled.

This method of propulsion, broadly considered, is not new.

My invention consists in a certain arrangement of the parts of the vehicle, as hereinafter described.

The nature of my invention, and the manner in which the same is or may be carried into effect, will be readily understood by reference to the accompanying drawing, in which—

Figure 1:
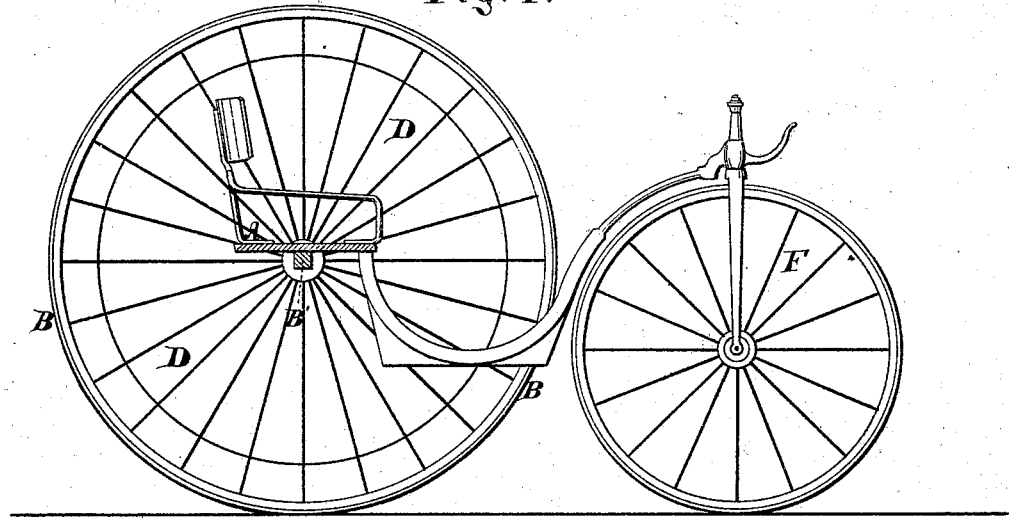
Figure 2:
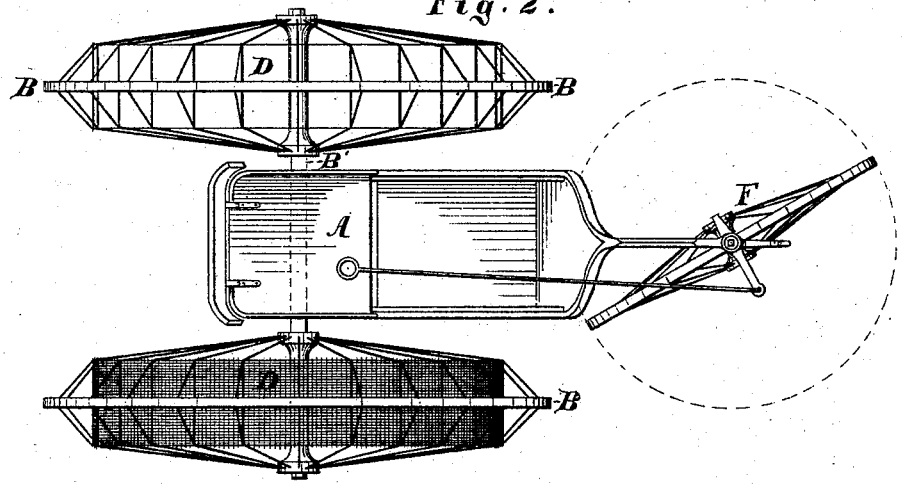

Figure 1 is a side elevation, and Fig. 2 is a plan, of a carriage adapted to carry my invention into effect.

A is the seat. B B are the driving-wheels, mounted loosely on the axle B'; and F is the front wheel. The wheels are made of metal, and are very light. The tire is formed of a band of rubber, held in a circular metallic tire or support of a V shape in cross-section. Within the compass of the wheels are formed cylindrical cages D, formed by bars of wood or metal radiating from the hub, and connecting at their outer ends with a cylinder, forming the periphery of the cage. The tire of the wheel encompasses the periphery of the cage, as shown.

The cages may be open on one side. Within them are placed the animals intended to drive the vehicle. The animals are placed so that their weight will come somewhat in advance of a vertical plane through the axes of the cages; and they may be fastened in this position by being attached to some fixed part of the vehicle, as, for instance, to rods attached to the axle at points within the cages.

The peculiarity of the above-described arrangement is that the seat and body of the vehicle are so placed over the driving-wheels that the weight of the vehicle, as well as of the occupant thereof, comes so nearly over the axle of the driving-wheels as to be almost balanced or in equilibrium, there being, of course, a slight excess of weight in front of the axle, to keep the front or guiding wheel down, and to prevent the vehicle from tilting.

By thus distributing the weight comparatively little power is required to propel the vehicle, and I am thus enabled to use dog-power as a propelling agent.

What I claim, and desire to secure by Letters Patent, is—

The combination of the axle and driving-wheels and their cages with the front wheel and seat or body of the vehicle, arranged together in the manner shown and described, to bring the greater portion of the weight of the vehicle and the occupant thereof directly over the axis of rotation of the driving-wheels and their cages.

In testimony whereof I have signed my name to this specification before two subscribing witnesses.

N. HURET.

Witnesses:
EMILE BARRAULT,
AUG. VINCK.